P. G. SCHMIDT.
GAS WASHER.
APPLICATION FILED FEB. 25, 1911.
1,051,016.
Patented Jan. 21, 1913.
3 SHEETS—SHEET 1.
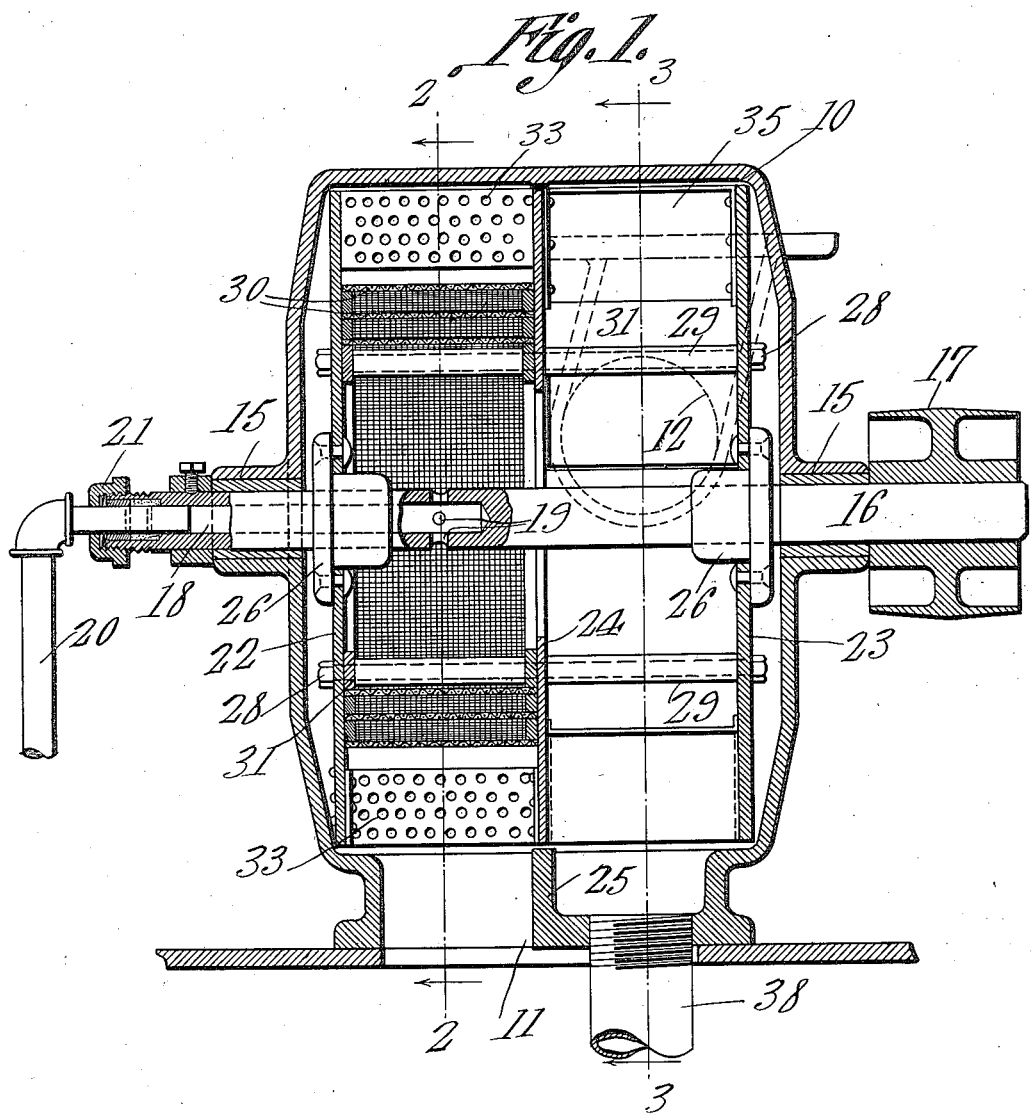

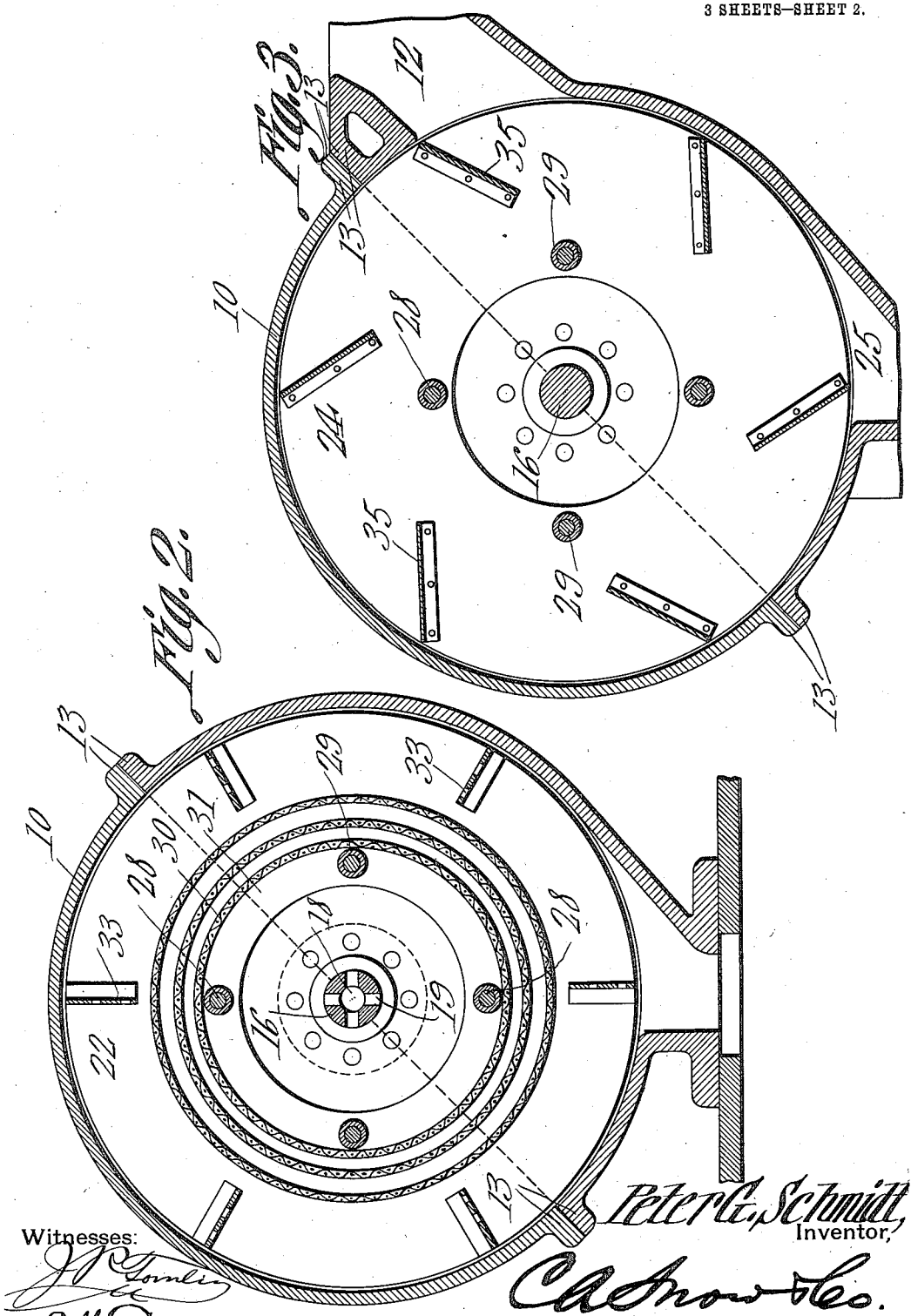

P. G. SCHMIDT.
GAS WASHER.
APPLICATION FILED FEB. 25, 1911.
1,051,016.
Patented Jan. 21, 1913.
3 SHEETS—SHEET 3.
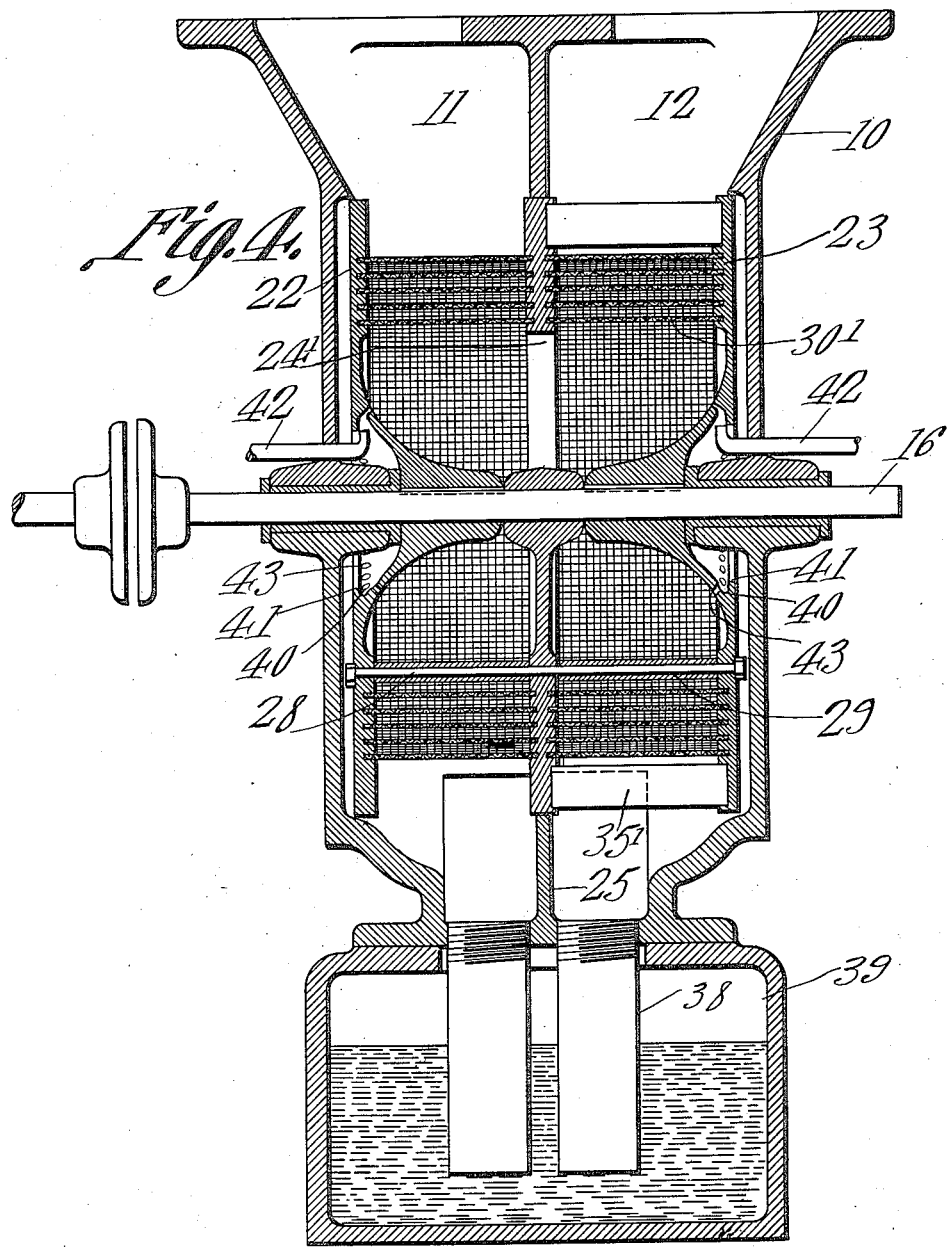
Witnesses:
Peter G. Schmidt,
Inventor
by
Attorneys.

UNITED STATES PATENT OFFICE.

PETER G. SCHMIDT, OF OLYMPIA, WASHINGTON.

GAS-WASHER.

1,051,016.

Specification of Letters Patent.

Patented Jan. 21, 1913.

Application filed February 25, 1911. Serial No. 610,767.

*To all whom it may concern:*

Be it known that I, PETER G. SCHMIDT, a citizen of the United States, residing at Olympia, in the county of Thurston and State of Washington, have invented a new and useful Gas-Washer, (Case A,) of which the following is a specification.

This invention relates to gas washing or cleaning apparatus, and has for its principal object to provide a device of very simple construction for washing, cleaning and purifying any gas by which term it is meant to include air, and removing therefrom any dust, tar, vapors, volatile matter, or any other entrained foreign substance of a mechanical nature, or any impurity of a chemical or mechanical nature, the apparatus being so constructed as thoroughly to break up or divide the gas in the presence of a very fine liquid spray, preferably water, the resultant compound being a mixture or emulsion of particular intimacy.

A further object of the invention is to provide a washer in which the gas is acted upon by centrifugal force and is otherwise treated in order to lower its temperature and reduce its volume, thereby condensing any moisture which may be carried over by the gas and precipitating the same, while the body of the gas is very finely divided and subjected to the action of the very finely divided washing spray.

A still further object of the invention is to provide an apparatus in which the direction of flow of the gas is reversed or diverted thereby causing it to deposit saturation and impurities.

With these and other objects in view, as will more fully hereinafter appear, the invention consists of certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a vertical section of a gas washer constructed in accordance with the invention. Fig. 2 is a transverse sectional view of the same on the line 2—2 of Fig. 1. Fig. 3 is a similar view on the line 3—3 of Fig. 1. Fig. 4 is a view similar to Fig. 1 illustrating another form of gas washer constructed in accordance with the invention.

The washer is provided with a main casing 10 of generally cylindrical form and preferably is made in two sections connected by bolting flanges 13 as shown in Figs. 2 and 3. At the bottom of the casing is an inlet port 11 through which the gas passes into the washer and a discharge port 12 through which the cleaned gas passes off to a gas engine, or a gasometer or other means of utilization or storage.

The opposite side walls of the casing are provided with bushings 15 that form bearings for a shaft 16 provided at one end with a belt pulley 17 or some equivalent means. The shaft is bored out at one end in order to form a water passage 18 from which lead a plurality of spraying ports 19 for water or other liquid employed for washing purposes, such water being forced in in the form of a number of jets or sprays thrown outward under considerable pressure and strike against the gas within the casing. The water or other liquid is supplied from a pipe 20, one end of which fits within the hollow shaft and this end of the shaft is provided with a suitable stuffing box as indicated at 21.

The shaft carries a rotary beater or agitator comprising a pair of end disks 22 and 23 and an intermediate ring or annulus 24 which serves in connection with a partition wall 25 to divide the interior of the casing into two main compartments, one of which at the inlet side communicates with the inlet port 11, while the other communicates with the discharge port 12.

The end disks 22 and 23 are rigidly secured to collars 26 on the shaft 16 and are held in properly assembled and spaced relation by tie bolts 28 and filling or spacing tubes 29.

Arranged in the inlet compartment and supported in position in the rotor is a series of concentric cylindrical screens 30 which may be formed of wire netting or perforated metal, the inner one of said screens being of greater diameter than the opening of the ring 24 and being held in place by a pair of supporting rings 31 that are secured to the disk 22 and the ring 24. The position of these screens is such that all of the gas entering the washer is compelled to pass through the screens before it can escape through the discharge port 12, and in passing through the screens the gas will be practically wire drawn or super-divided and while in this condition will be subjected to the action of the washing fluid which is reduced to the condition of a mist or cloud, by the impact of the screens thereon.

The disk 22 and ring 24 serve as supports for a circular series of perforated blades 33 arranged near the periphery of the rotor and which operate to break up the gas and wire draw it through the perforations for the purpose of separating mechanical impurities. The blades further operate to carry the gas around within the casing, so that the same may be subjected to the action of centrifugal force, which will tend to force the heavier matters held in suspension, or any heavy vapors, to the wall of the casing and periphery of the rotor, while any relative light purified and washed gases will naturally accumulate at the center of the rotor. As the entering gas passes through the screens 30 and thence through the opening at the center of the ring 24 it is then acted upon by a plurality of blades 35 exercising a direct pull on the gas and tending to carry the same outward toward the periphery of the rotor, the gas being forced outward through the discharge port 12 in much the same manner as the escape of the air from a blower.

It will be observed that in the operation of the washer forming the subject of the present invention, a number of principles involving various classes of cleaning, scrubbing, and purifying apparatus are combined in a single structure, and in operation various impurities in dry, liquid, semi-liquid and vaporous form are separated from the gas, these impurities passing downward through a discharge pipe or pipes 38 into a collecting tank 39 that is arranged below the main casing, or the pipe or pipes 38 may be otherwise arranged for the disposition of the separated impurities.

The dry impurities generally include dust, lamp black, metallic and ash particles. The liquid impurities include moisture and various compounds; the semi-liquid impurities are oils, tars, tarry matters and various viscous hydro-carbons, and the vaporous impurities are in the form of aqueous vapor, viscous vapor or fogs and inert or uncombined gases such as carbon dioxid.

The gas entering the washer is cooled by the spray of water or other washing liquid and this effects a change of vapor tension, and, also, change of volume, the reduction in temperature naturally causing condensation and a deposit of any heavy matter which may be held in suspension. The change in volume is in part due to the change in temperature and further to the mechanical action of the rotor, resulting also, in difference in pressure at different points within the casing. This change in pressure with the consequent variation in volume tends to press out excess moisture and cause the same to precipitate. A further and important action is that due to centrifugal force. As the gas is carried around by the rotor, the heavy impurities will naturally be thrown outward to the wall of the casing, owing to their greater specific gravity, while purified gases or vapors, relatively lighter than the unpurified gas itself will accumulate at the center, thus separating the impurities. In the second compartment the separating action is intensified by the outward pull of the blades. In this connection it will be noted that a segregation is made to take place through the opposition of centrifugal force to suction. This emphasizes, increases and intensifies the action of separations, the heavier impurities being thrown to the outside or periphery of the blades of the first section or stage; the lighter gases occupying the interior of the zone thus formed which zone formation is intensified by the suction effort of the second stage or fan in opposition to the centrifugal action and said fan removing from the low pressure zone the gas thus segregated. Another important factor is the reversal of direction of the flow of gas. Any gas whose direction of flow is reversed or diverted tends to deposit saturation, entrainment, and impurities, this action being partly centrifugal and partly static in its nature. There is also the wire drawing action to be considered. All of the gas must first pass through the reticulated screens and thus be mechanically strained and filtered, and at the same time, by the action of the rapidly moving rotor a violent whirling motion is given to the gas. While in this broken or divided condition the gas is subjected to the action of the jets of water which are traveling in a direction opposite that in which the small streams of impure gas are moving.

The rotor is driven at high speed and the water spray on passing through the screens is beaten thereby into an exceedingly fine spray like a mist or cloud. At the same time this watery mist is given a whirling motion causing it to move to the walls of the casing under the action of centrifugal force. The incoming impure gas is forced to traverse this violently agitated mist and is itself whirled about by the rotor, thus the water is caused to present an extensive absorption surface because of its superdivision and the intimate mixture therewith of the fine streams of gas causes the latter to be cleansed of nearly or quite all of the impurities. The cleansed gas is now in the interior of the rotor and because of the pulling or impelling action of the blades 35 flows through the annulus 24 into the second chamber carrying more or less moisture with it.

The finely divided water passing out through the screens in the first compartment of the rotor, carries the absorbed gas impurities with it and strikes and clings to the walls of the casing, the fine water particles coalescing and forming into drops and streams and gravitating to the inlet 11 where they may escape into the gas containing vessel on which the gas washer is mounted.

The cleansed gas passing to the second chamber or compartment in the rotor is driven by the impelling blades 35 to the periphery of the casing and finally through the outlet port or passage 12. In this second compartment the gas is given a whirling movement by blades 35 and impurities and moisture, if present, are driven by centrifugal force to the inner wall of the casing to finally gravitate to the pipe 38.

Owing to the peculiar intimacy and intermixture of the various elements of which the gas is composed, and which it carries into the washer, there has been in most cases considerable difficulty in the production of a pure gas, but by subjecting the gas to the various actions and forces herein described, the gas will be broken up and washed and purified in such manner as to separate not only the mechanical impurities and excess moisture, but, also, chemical impurities, such as ammonia, carbon dioxid, sulfur, and other compounds which may be detrimental to the efficient use of the gas.

In the modified construction shown in Fig. 4 the operation is much the same as that heretofore described. The central ring 24' is provided with a central hub and radial supporting arms and a suitable number of screens 30' are used. These screens are disposed in concentric relation to both the inlet and discharge compartments of the drum or rotor and the blades 35' are radial. The hub portions of the end disks of the drum or rotor are recessed, as indicated at 40 and at the margin of each recess is an inwardly extending flange 41 forming a circular liquid holding channel to which liquid is delivered from supply pipes 42. The liquid is driven by centrifugal force through a number of spraying openings 43 and is directed against the gas in the interior of the drum.

In the structure shown in Fig. 4 the action of the device so far as the first compartment is concerned is the same as in the structure shown in Fig. 1, except that the blades 33 are not present, the gas passing to the interior of the rotor through screens 30' and the whirling mist of washing fluid against the action of centrifugal force. In the second compartment this action is reversed and the gas passes in the same direction as the washing fluid, both moving under the action of centrifugal force and both being violently whirled about and beaten to a superdivided state and thoroughly intermixed.

What is claimed is:—

1. In a gas washing apparatus, a casing having inlet and discharge ports, a rotor within the casing, and screening means carried by said rotor, the inlet and discharge ports being located at points opposite the periphery of the rotor.

2. In a gas washing apparatus, a casing having inlet and discharge ports, a rotor within said casing and having a centrally disposed ring dividing such rotor into inlet and discharge compartments, and a reticulated screen carried by the rotor on the inlet side thereof and through which the gas is compelled to travel, the outlet side of the rotor being unscreened.

3. In a gas washing apparatus, a casing having inlet and discharge ports and provided with an approximately central partition having a circular opening therein, a rotor within the casing and having a central ring in alinement with said partition, and a screen carried by the rotor, on one side of said partition, the outer side of the rotor being unscreened.

4. In a gas washing apparatus, a casing having inlet and discharge ports, a rotor therein provided with a centrally disposed ring dividing the rotor into inlet and discharge compartments, a cylindrical screen arranged in the inlet compartment and through which the entire body of gas is compelled to pass, the outlet compartment being unscreened, and means for introducing washing liquid into the interior of the rotor.

5. In a gas treating apparatus, a rotor having a screen at one end thereof, the other end being unscreened, means for rapidly rotating the rotor to generate centrifugal force, means for causing the entering gas to pass centripetally through the rotor by suction in opposition to centrifugal force, and means for completely filling the interior of the screen with centrifugally moving cleansing sprays.

6. In a gas treating apparatus, a casing, a rotor therein having a screened end and a bladed end communicating with each other at the center of the rotor, inlets and outlets for the casing at points opposite the periphery of the rotor, means for producing an annular centrifugally moving body of spray inside the screened end of the rotor, the bladed end of the rotor serving to draw gas centripetally through the moving body of spray.

7. A gas treating machine having inlets and outlets, a rotary screen, blades rotatable with the screen, and a partition separating the screen and blades and having an opening at its center, for the purpose described.

8. A gas treating machine having a casing, a circular screen therein, rotary blades therein, a partition separating the blades from the screen and having an opening at its center, and means for completely filling the space inside the screen with centrifugally moving sprays for the purpose described.

9. A gas treating machine having a casing, a rotary screen in the casing, rotary blades in the casing, a partition separating the blades from the screen and having a passage at its center, the blades serving to produce suction through said passage and through the screen, means for annularly filling the space inside the screen with centrifugally moving sprays, an inlet in said casing disposed opposite the periphery of said screen, and an outlet in said casing disposed opposite the periphery of said blades.

10. An apparatus for treating gas comprising a casing, means for producing centrifugally moving radiating sprays in said casing, and means for drawing gas by suction centripetally through said sprays from the outer concentric stratas thereof, on lines radial to the center thereof.

In testimony that I claim the foregoing as my own, I have hereto affixed my signature in the presence of two witnesses.

PETER G. SCHMIDT.

Witnesses:
   JOSEY RBJOUKERT,
   A. J. COLBY.